United States Patent [19]
Shaw

[11] Patent Number: 6,095,275
[45] Date of Patent: Aug. 1, 2000

[54] CONVERSION SYSTEM FOR ALL TERRAIN VEHICLES

[76] Inventor: Charles T. Shaw, 3808 Chester Ave., Bakersfield, Calif. 93301

[21] Appl. No.: 09/027,465

[22] Filed: Feb. 21, 1998

Related U.S. Application Data

[63] Continuation-in-part of application No. 08/592,438, Jan. 26, 1996, abandoned, which is a continuation-in-part of application No. 08/574,963, Dec. 19, 1995.

[51] Int. Cl.[7] .................................................. B62M 27/02
[52] U.S. Cl. .......................... 180/185; 180/192; 180/193; 180/9.21; 305/127
[58] Field of Search .................................... 180/182, 183, 180/184, 185, 189, 192, 193, 9.21, 9.26; 305/127, 130, 131

[56] References Cited

U.S. PATENT DOCUMENTS

| | | | |
|---|---|---|---|
| 3,545,559 | 12/1970 | Jones et al. .............................. | 180/185 |
| 3,856,099 | 12/1974 | Bowers .................................... | 180/193 |
| 3,960,229 | 6/1976 | Shio ........................................ | 180/9.62 |
| 4,448,273 | 5/1984 | Barbieri ................................. | 180/9.21 |
| 4,618,015 | 10/1986 | Yochum ................................. | 180/9.21 |
| 4,635,740 | 1/1987 | Krueger et al. ........................ | 180/9.21 |
| 4,699,229 | 10/1987 | Hirose et al. .......................... | 180/9.21 |
| 4,706,769 | 11/1987 | Latourelle et al. .................... | 180/9.21 |
| 4,953,919 | 9/1990 | Langford ................................ | 305/144 |
| 4,981,188 | 1/1991 | Kadela .................................... | 180/9.62 |
| 5,273,126 | 12/1993 | Reed et al. ............................. | 180/9.26 |
| 5,330,019 | 7/1994 | Cartwright ............................. | 180/9.21 |

OTHER PUBLICATIONS

3&4 Wheel Action, Nov. 1992, "A Snowmobile Conversion" pp 49–55.
Dirtwheels Magazine, Dec. 1994, "Snow Quad!" pp 38–42.
II–Tracker Inc. Advertisement, 9 pages.
Kimpex USA Ltd. Advertisement, 4 pages.

*Primary Examiner*—Kevin Hurley
*Attorney, Agent, or Firm*—Don E. Erickson

[57] ABSTRACT

A conversion system for converting an all terrain vehicle (ATV) for use in snow and in other adverse condition, the system including an endless track assembly. Endless track assemblies are comprised of a drive cog mounted on the rear axle, having teeth for engaging a track, and a slide rail assembly for guiding and tensioning a composite track. The drive cog is uniquely designed to provide optimal power to gear ratios to be used with the drive gear of the ATV. The standard ATV axle may be replaced with a stronger axle. The track mount assembly is mounted by a bearing housing support constructed to fit the axle. The drive cog is constructed with bolt patterns compatible with bolt patterns on existing ATV axle mounts. A unique motion-limiting device keeps the track assemblies properly positioned when riding over uneven terrain. The track mount assemblies provide a dual track construction that replaces the ATV drive wheels and converts the ATV to a vehicle that can transverse terrains such as snow and mud. In snow conditions, a ski mount assembly that replaces the non-drive wheel or wheels on an ATV may be employed. A ski mounting assembly is constructed to be bolted on an existing front end spindle of the ATV.

27 Claims, 7 Drawing Sheets

CONVERSION SYSTEM FOR ALL TERRAIN VEHICLES

SPECIFICATION

This Application is a Continuation-in-Part of application Ser. No. 08/592,438, filed Jan. 26, 1996, now abandoned which was a Continuation-in-Part of abandoned application Ser. No. 08/574,963 filed Dec. 19, 1995.

BACKGROUND OF THE INVENTION

1. Field of the Invention

This invention relates to an all terrain vehicle (ATV) and vehicles especially adapted for snow and for other terrains in which standard tires are ineffectual, such as mud. And more particularly, this invention relates to a conversion system to convert an the standard tires of ATV for use in snow and such other terrains in which the standard tires are ineffectual.

2. Background Information

An ATV is a three or four wheel vehicle similar to a motorcycle for use in rugged terrain such as mountains and other areas. This type of vehicle is functional in the Summer, but for the most part, is not very useful in the Winter, particularly when it snows, or on other terrains in which standard tires are ineffectual. This puts a seasonal limitation on an ATV.

During the Winter season, in areas where snow covers the ground, people resort to a vehicle known as a snowmobile. These vehicles have tracks, as opposed to wheels, which are better for running in snow. However, the expense of owning both an ATV and a snowmobile is for many, prohibitive. However, the seasonal limitations on these vehicles means that in some areas, both will be needed.

When the owner of an ATV resides in an area where Winter is severe, an ATV is difficult, if not impossible to use. Even an ATV with special tires is not practical or safe for use in snow and ice. For that reason, the ATV is invariably stored during the Winter months and replaced with a snowmobile.

Additionally, in areas in which the terrain makes driving with standard tires difficult, such as mud and similar surfaces, the ATV is largely ineffectual, and other modes of transportation must be adopted.

To solve this problem, attempts have been made to convert an ATV for use in snow, or for other terrains, but to-date, no practical system has been successful. One method is to provide wrap-around snow treads. Another method is to replace the stock tires with snow tires. Neither of these methods provide a machine that is very good in snow. They do not work at all well or as advertised, and are too complicated or too expensive for practical use. It would be advantageous if a system could be provided that is as simple as possible to convert an ATV for use in snow, and then be able to easily reconvert it back for use on dirt. It would also be advantageous to be able to do this at an expense that would be a substantial savings over having two separate vehicles.

An object of the present invention is to provide an ATV conversion system that permits conversion of an ATV into an all season vehicle. Yet another object of the present invention is to provide an ATV conversion system that allows the vehicle to be easily converted for use in snow, and other terrains in which standard tires are ineffectual, and converted back easily to standard wheels and tires for use on dirt. It is also an object of the present invention to provide an ATV conversion system that is as simple as possible. Yet another object of the present invention is to provide an ATV conversion system that makes it equally simple to convert the vehicle back for use with conventional tires. Still another object of the present invention is to provide a snow conversion system that permits conversion of an ATV by removal of the wheels and installing cog-driven dual rear tracks, and replace the front wheel or wheels with skis. Yet another object of the present invention is to provide an ATV conversion system that includes a drive axle designed for use with both cog-driven tracks and standard ATV wheels. Yet another object of the present invention is to provide an ATV conversion system, including an adjustable torsion bar to provide proper weight transfer.

Yet another object of the present invention is to provide an ATV conversion system having a wide drive cog for receiving snow tracks that provide optimum power transfer. Still another object of the present invention is to provide an ATV conversion system having drive cogs and a wheel replacement system that includes track tension adjustment. Yet another object of the present invention is to provide an ATV conversion system with a drive cog and snow tracks that include a double slide rail for optimal weight distribution. Yet another object of the present invention is to provide an ATV conversion system having a drive cog and snow tracks that includes a track guide alignment system. Still another object of the present invention is to provide an ATV conversion system having a ski assembly for replacing the front wheel or wheels that includes a brake retention mount.

Prior art has addressed various methods of attaching tracks to wheeled vehicles. U.S. Pat. No. 3,860,080 discloses apparatus for mounting and endless track on the tire of the vehicle without removal of the tire. The apparatus includes means for tightening the track around the upper periphery of the tire, and means, attached to the bumper and frame of the vehicle, for limiting the rotation of the apparatus. Such apparatus is inadequate in several ways: 1) the track is only in frictional contact with the wheel, enabling the wheel to rotate within the track when the friction on the bottom surface of the track exceeds the friction between the wheel and the track; and 2) the means for limiting the rotation of the apparatus is a pair of chains which, under appropriate circumstances, can damage either the bumper of the vehicle, or the apparatus, or both.

U.S. Pat. No. 3,939,930 embodies the same concepts as the '080 patent above in that the limiting device on rotation of the track apparatus is a chain attached to the bumper of the vehicle, and suffers the same shortcomings. In contrast to the '080 patent, the '930 patent discloses a sprocket which replaces the tire of the vehicle, the teeth of which sprocket extend outwardly to then mesh with apertures in the track in order to propel the track.

U.S. Pat. No. 4,448,273 discloses an apparatus for replacing the wheels of a vehicle with an endless track assembly. The apparatus included a sprocket for receiving cogs manufactured on the inner surface of the track. The sprocket is attached directly to the hub of the vehicle axle by means of a flange at one end of a shaft on which the sprocket is mounted. This apparatus is inadequate in that the sprocket is sufficiently narrow that any sideways displacement of the track will result in the track becoming displaced from the sprocket. In addition, there are no idler wheels on the outside portion of the track to maintain the track in optimum contact with the terrain. And lastly, the apparatus does not have any means of restricting the undesired rotation of the apparatus, or to bias the apparatus in an attitude conducive to traversing uneven terrain.

The assembly of the invention addresses the problems noted above by providing a easy to mount conversion system which requires no modification to the standard ATV. The drive sprocket of the track extends the width of the track, providing a larger footprint for the ATV, and the assembly includes a means for biasing the track that does not pose the opportunity for damage to the ATV.

BRIEF DESCRIPTION OF THE INVENTION

The purpose of the present invention is the conversion of an ATV to an all season vehicle, by allowing interchangeability of a cog-drive and rubber belted snow tracks from and to conventional wheels.

The conversion system, for all terrain vehicles of the present invention, allows an ATV to be converted to an all season vehicle. The conversion involves replacing the present ATV axle with a stronger axle that is designed for use with conventional wheels, as well as with the conversion package of a cog-drive and tracks. The front wheels may be replaced with skis that include an automatic ski positioning pad and a brake caliper retention mount to minimize mechanical changes to the ATV.

By removing the wheels of an ATV and replacing them with ski leg assemblies on the front, and track assemblies on the rear, the ATV becomes a snow machine. A pair of half-tracks, mounted on track assemblies, replace the rear tires. At the front, snowmobile style front skis replace the front wheels. The conversion process is made as simple as possible, and includes components that readily bolt on to existing mounting holes that eliminates the need for welding, cutting or machining the ATV.

To mount the track mount assemblies, the rear axle is replaced with a new stronger axle designed to fit dual bearing carriers on the rear tracks. Both stock rear wheels are then removed and replaced with dual rear track assemblies.

The dual rear track assemblies are comprised of a drive cog mounting on the axle, having a diameter that is selected to maintain an optimum ratio of engine RPM to cog RPM. The drive cog selected, is designed with a hub to fit standard wheel bolt patterns. Snow tracks are supported by the drive cog and a pair of dual slide rails, having roller guides, tensioning bolts and bearing housing support connecting the slide rails to the axle.

A track motion limiting device ties the track assembly to the ATV chassis and allows for limited movement of the track assemblies about the axle axis while allowing the tracks to follow uneven terrain. In one embodiment, the track motion limiting device is comprised of a bracket assembly that is light in weight and is adjustable to adjust the motion limiting force. The bracket assembly enables the snow track assemblies to follow the terrain while preventing them from flipping upside down or hitting other parts of the ATV, particularly if the machine should become airborne. This motion limiting bracket assembly results in improved traction and does not adversely affect the ATV suspension. The preferred bracket assembly allows full and free travel of the suspension.

In an optional embodiment of the invention, a sway bar is provided to limit motion of the tracks and connects the rear swing arm of the ATV to the track mount assemblies. The sway bar is adjustable to increase the torsion, or downward force, on the rear of both tracks simultaneously.

The track mount assemblies also include adjusting bolts for adjusting the tension on the rubber snow tracks. Tensioning bolts move a rear idle wheel axle to tighten or loosen track tension.

The above and other novel features of the invention will be more fully understood from the following detailed description and the accompanying drawings, in which:

DETAILED DESCRIPTION OF THE INVENTION

Figure 1:
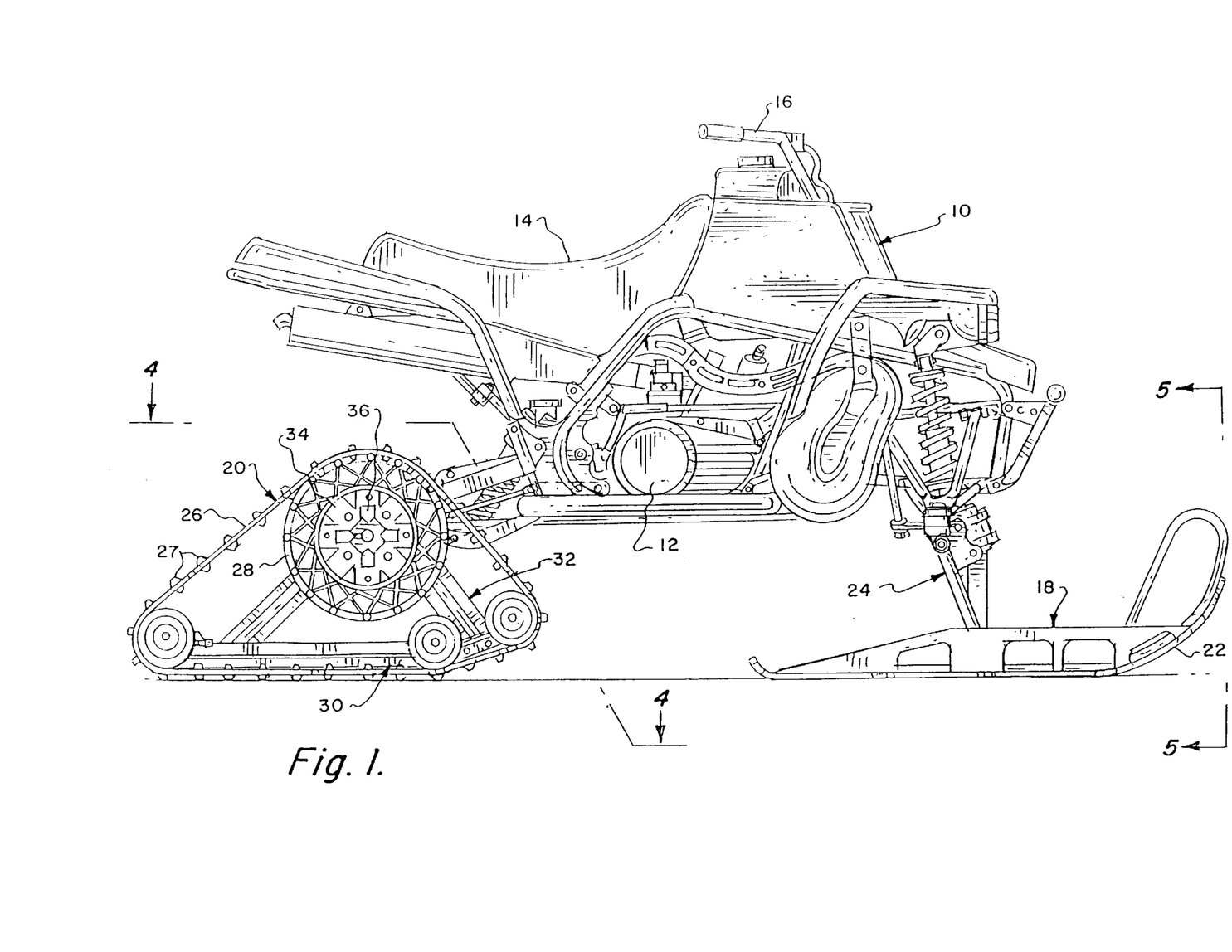
FIG. 1 is side elevation of an ATV, including the conversion system to convert the ATV to a snow machine.

A conversion system, to convert an ATV to a snow machine, is illustrated in FIG. 1. A customary ATV 10 is shown having an engine 12, seat 14 and handlebars 16. These components are unchanged with the conversion system of the invention whose unique aspect is that no major modifications need to be made to ATV 10. All the components and assemblies bolt to existing ATV parts, and require no welding, cutting or machining.

Although the exemplary embodiment is discussed in terms of a snowmobile, it should be understood that tracks designed equivalently for mud, or other adverse conditions can also be used. In addition, the track assembly could be mounted on the front axle of the ATV, resulting in an ATV having tracks at all locations where standard tires were previously mounted. Thus the scope of the invention is not constrained by the type of track employed, or the location of the wheels being replaced. Alternatively, just the drive wheels of the ATV could be converted, leaving the standard tire/s on the non-drive axle/s.

To convert ATV 10 for use in snow, the front wheels are replaced with ski assembly 18 and the rear wheels replaced with track assembly 20. Front ski assembly 18 is comprised of a ski 22 and a ski support assembly 24 that will be described in greater detail hereinafter.

Track assembly 20 is comprised of a rubber half-track 26, having cleats 27, mounted on drive cog 28, and lower supporting slide rail assembly 30 connected to the axle of the ATV by bearing housing support assembly 32. An important and unique feature of the invention is drive cog 28, which is constructed of a high strength plastic. Drive cog 28 has a hub 34, constructed to fit the bolt pattern on an ATV axle mount 36. This construction permits the use of existing axle mounts and no special mount is needed. This simplifies assembly and mounting of track assembly 20. The track assembly may be adapted to fit on any standard three or four wheel ATV. However, due to the strength characteristics of the standard axle, it may be preferable to employ a higher strength axle, designed for more rigorous weight bearing activities. Without limiting the scope of the invention, the preferred embodiment is discussed in terms of replacement of the standard axle with a stronger axle, adapted to fit both the standard wheels and the track assembly.

Drive cog 28 has a plurality of teeth 38 (FIG. 2) constructed to engage lugs or knobs 40 on half-track 26. Approximately sixteen to eighteen teeth 38 are provided on drive cog 28, which is related to the design of track 26 and determines the overall track mount design. The width and length of drive cog 28 are selected to optimize traction and force loading on track 26. That is, the width provides even distribution of the force across track 26, improving track life due to less wear and provides improved drive cog-track connection.

Drive cog 28 has a diameter in the range of eleven to twenty-four inches selected to set an optimal ratio of track speed/gear that is important for the mobility of the vehicle. This diameter allows optimal spacing of slide rail 42 on slide rail assembly 30, as will be described in greater detail hereinafter.

Figure 3:
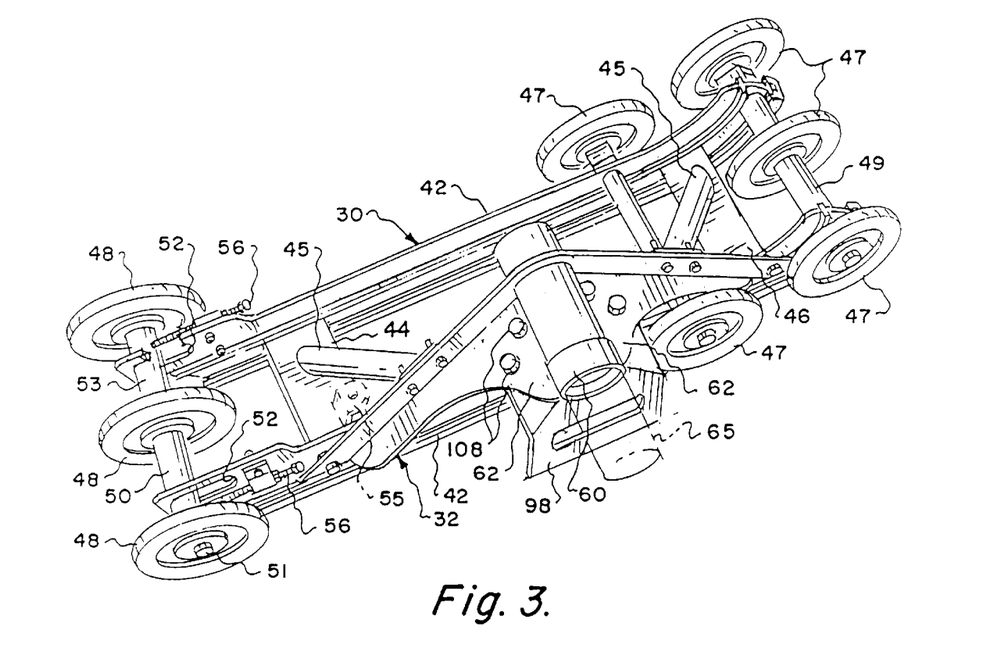
FIG. 3 is a perspective view of a slide assembly for the track mount assembly.

Slide rail assembly 30 is illustrated in FIG. 3, and is comprised of a pair of slide rails 42, mounted on bearing support assembly 32. Spacing plates 44 and 46, on bearing support assembly 32, optimize spacing for the width and weight of track 26. Even weight distribution of track 26 helps to reduce wear on the track. The length of slide rails 42 is selected to optimize "track footprint" (snow traction) and accounts for track width. Combined width of track 26 provides a total combined traction footprint for both tracks of approximately six hundred and seventy-five square inches (675 inches$^2$). However, with different snow conditions and total vehicle weight the track footprint can vary between the range of five hundred and seventy five to seven hundred and seventy-five square inches (575 to 775 inches$^2$). The spacing of slide rails 42 optimizes the weight distribution and handling of ATV 10.

The shape and cross-sectional construction of slide rails 42 is made to work with modified parts from standard snowmobile slides and track cleats. This provides optimal structural linkages and improved strength.

The front curvature of slide rails 42 is designed for optimal location of track rollers 47 and determines the angle of attack for the leading edge of track 26. The curvature is dependent upon the length of slide track rails 42 and the diameter of drive cog 28. This length is selected to optimize track shape and provides for a minimum of three sections of idler guide wheels 47 at the front and idler guide wheels 48 at the rear. Forward idler guide wheels 47, on the curved portion of slide rails 42, are fixed. Rear idler guide wheels 48 are slightly larger and are mounted on an axle 50, engaging slots 52 and 54 in slide rails 42 for adjustment by tensioning bolts 56 and 58. Tensioning bolts 56 allow adjustment of axle 50 to adjust the tension in track 26. The system disclosed makes it easy to change tracks and apply the right amount of tension to track 26.

Axle 50 is comprised of a shaft 51 and tubular spacers that maintain the spacing of idler guide wheels 48 on the axle. Front axle 49, supporting idler guide wheels 47, is constructed in a similar fashion.

Bearing housing support assembly 32 is comprised of a bearing housing 60, mounted on support brackets or struts 62, which are bolted to slide track 42. Bearing housing support braces 45 are bolted to struts 62 at one end, and are securely attached by welding or other suitable means to spacers 44 and 46 at the other end.

Bearing housing 60 is constructed to directly fit on a stronger replacement axle 64 (FIG. 7) without any machining or other modifications. Replacement axle 64 replaces the standard axle provided with ATV 10. This allows track assembly 20 to be easily mounted on an existing ATV 10 without machining, welding or any other modifications. Bearing housing 60 allows spacing dual bearing races 67 to provide efficient load bearing on axle 64. This provides sufficient strength to uniformly support ATV 10. This also promotes longevity of moving parts and allows uniform bearing bracket 62 to be constructed to fit most makes and models of ATVs. The configuration shown, sets the optimal shape for weight distribution and supports slide rail assembly 30.

Figures 7, 8:
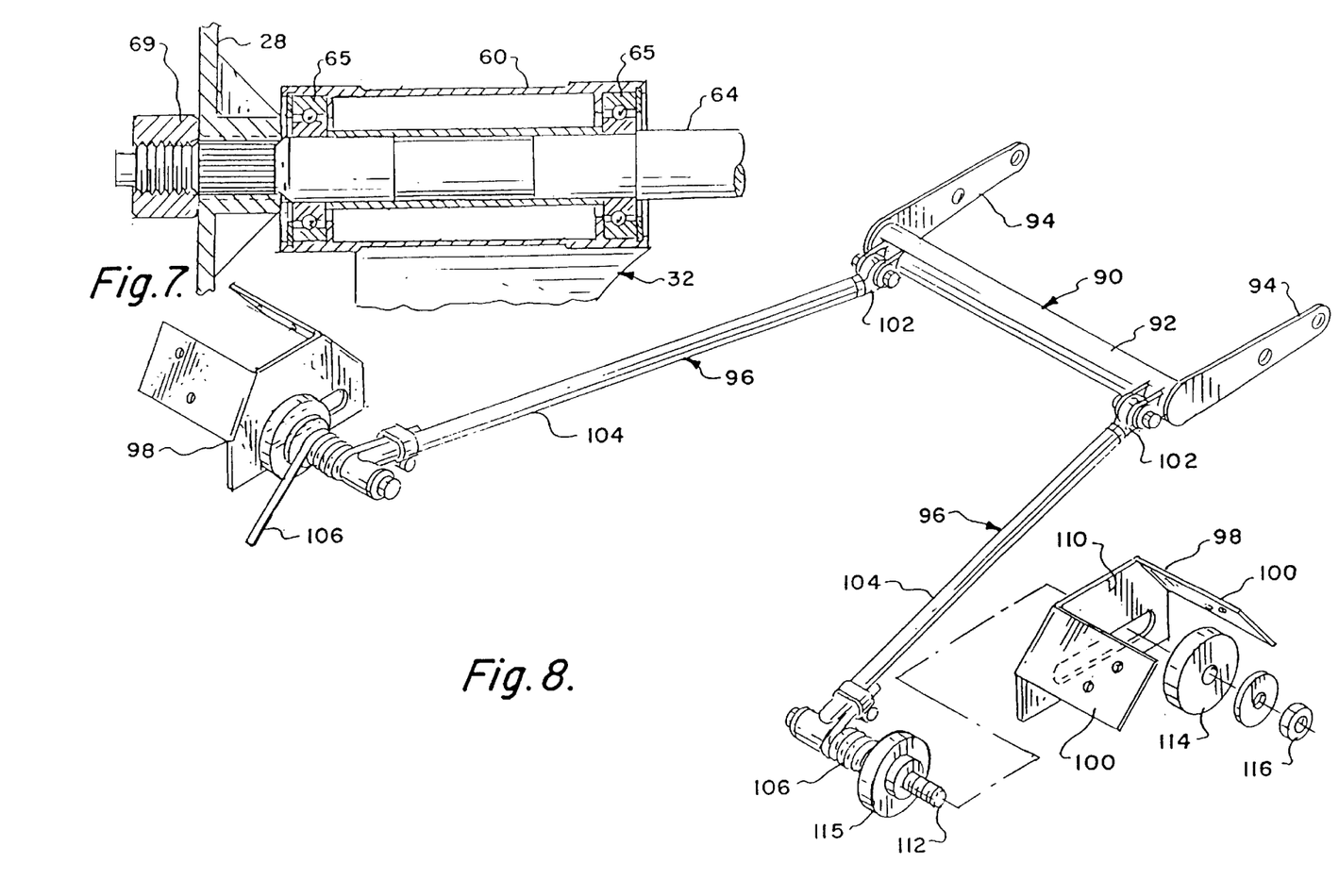
FIG. 7 is a section view taken at 7—7 of FIG. 2.
FIG. 8 is a partially exploded perspective view of a motion limiting bracket assembly that adjusts and controls the motion of the snow track assemblies.

As shown in FIG. 7, bearing housing 60 slides on axle 64 and drive cog 28 is bolted to existing ATV 10 with bolts 69. Axle 64 is constructed to make it stronger than a stock axle supplied with ATV 10, and is designed so that it does not have to be removed once installed, and may be installed, as part of the conversion system for mounting track mount assemblies 20. Axle 64 fits through axle housing 66, and into a bearing housing 60 on each side of ATV 10.

Figure 2:
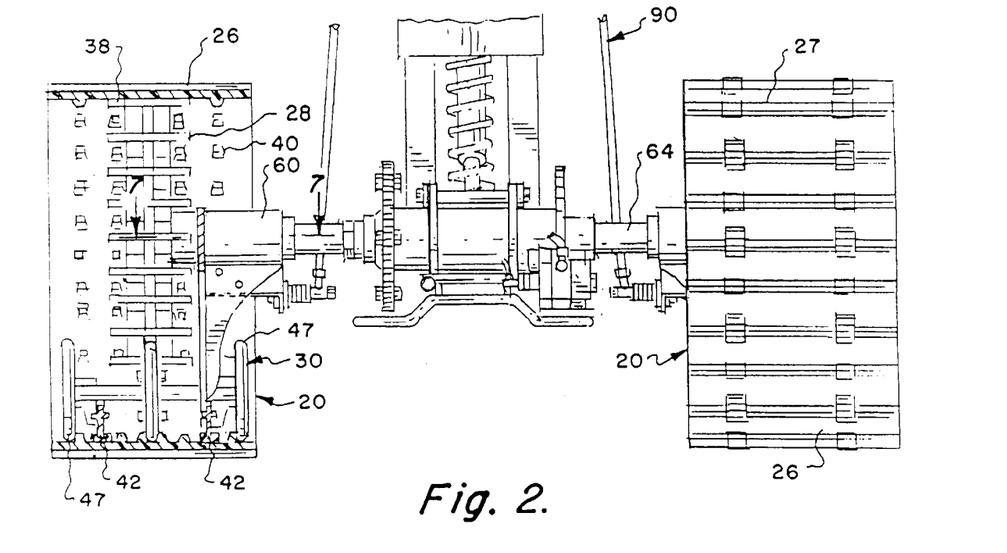
FIG. 2 is a partial sectional view taken at 2—2 of FIG. 10.
Figure 4:
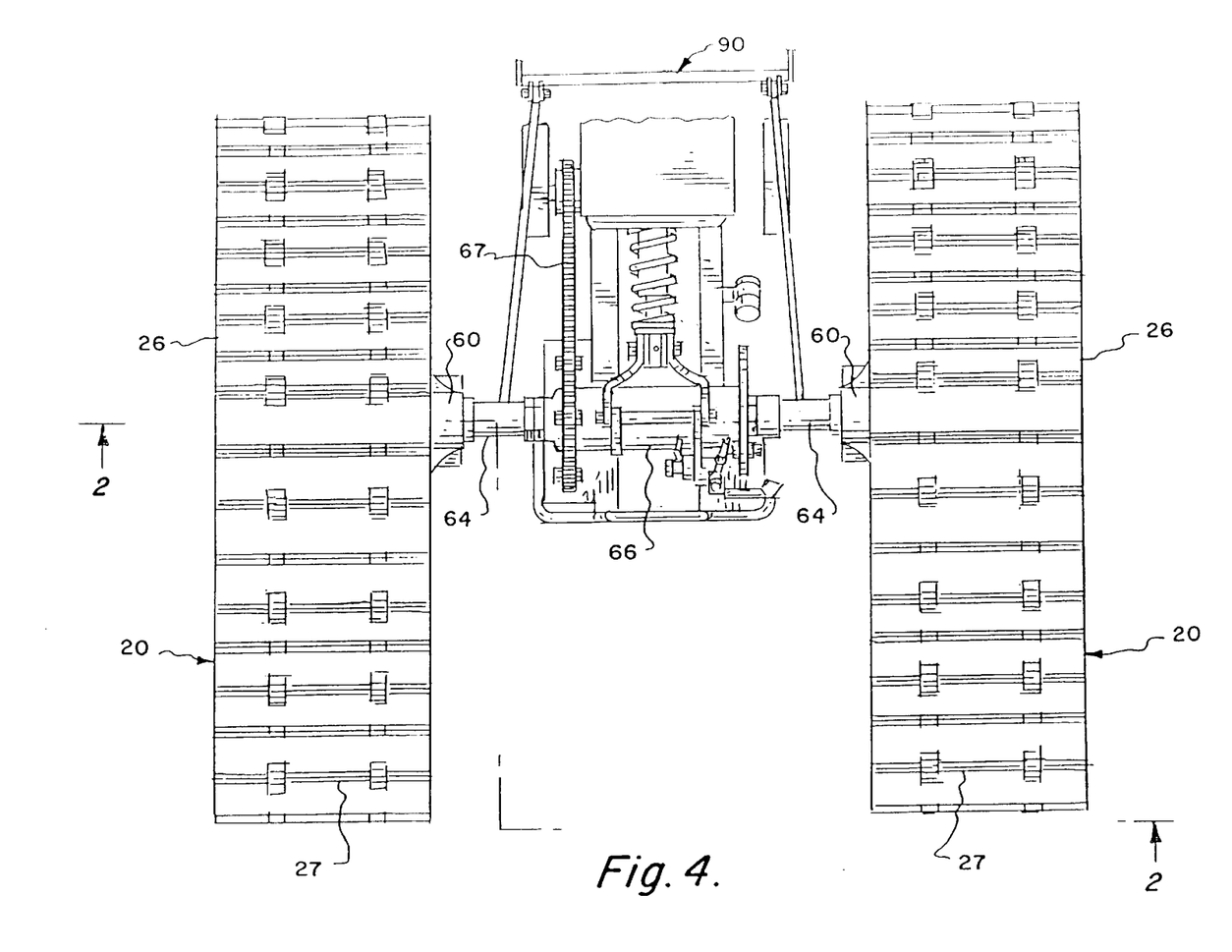
FIG. 4 is a partial sectional view taken at 4—4 of FIG. 4.

It is important that the track assemblies are balanced or stabilized with a downward force to maintain surface contact so that cleats 27, on snow tracks 26, grip the snow to prevent "free wheeling." In the conversion system illustrated in FIGS. 2 and 4, a motion limiting bracket assembly 90 is shown for limiting movement of snow track assemblies 20 about the axis of axle 64 while allowing the tracks to follow uneven terrain.

Motion limiting bracket assembly 90 is shown in greater detail in FIG. 8. Motion limiting bracket assembly 90 is comprised of a bottom bracket 92 having flanges 94 that attach to the base of the ATV at the foot pegs. Adjustable link arms 96 are attached to each track assembly by slot bracket 98. Each slot bracket 98 has slot bracket flange 100 that is bolted to struts 62 on bearing housing mounting assembly 32 as shown in FIG. 3.

Adjustable link arms 96 are constructed to be adjustable in a manner similar to a turnbuckle. Screw threads on swivel joints 102 are threaded into tubular link arms 104. The length of link arms 96 is adjusted by threading swivel points 102 into or out of tubular links 104.

In an optional, but preferred embodiment, threaded links 102 are provided at both ends of tubular link 104 so that link arms 96 can be lengthen or shortened by rotation of tubular link 104. Adjusting the length of link arms 96 provides increased or decreased motion limiting force to stabilize snow track assemblies 20.

In the embodiment illustrated in FIG. 8, coil torsion or "drop springs" 106 are provided to maintain some torsion on motion limiting assembly 90. Motion limiting assembly 90 is secured to bearing housing support bracket assembly 32 by bolts 108 securely fastening slot bracket 98 to struts 62. Link arms 96 are secured in slots 110 of support bracket 98 by threaded shaft 112, bushing 114 engaging slot 110 and fastened by nut 116.

Bottom bracket 92 mounts on the ATV by flanges 94 using existing bolt holes. The location is the same on all ATVs—at the base of the chassis, connected where the foot pegs are attached. This allows ease of installation by using existing bolt holes, which does not limit the function of the suspension.

Link arms 96 connect slot bracket 98 to a fixed point on the ATV (i.e., bottom bracket 92). Link arm 96 is connected to bottom bracket 92 by adjustable joints 102 to allow for lateral separation of slot bracket 98 and bottom bracket 92 attachment point. Slot bushings 114 and 115 attach link arm 96 to slot 110 in slot bracket 98. Slot bushings 114, 115 allow each snow track assembly to pivot about the axis of axle 64 within a narrow range, preventing the tracks from flopping upside down or running into parts of the ATV. The design of connecting bushings 114, 115 permit link arms 96 to be fixed to bottom bracket 92 while allowing for limited free movement of each snow track assembly.

Slot bracket 98, as previously described, is bolted to bearing housing support assembly 32 and has an elongated slot 110 receiving slot bushing 114 and bushing with shoulder 115. Preferably, slot 110 is in the range of two to four inches long and determines the travel angle through which each snow track assembly can pivot.

Figure 9:
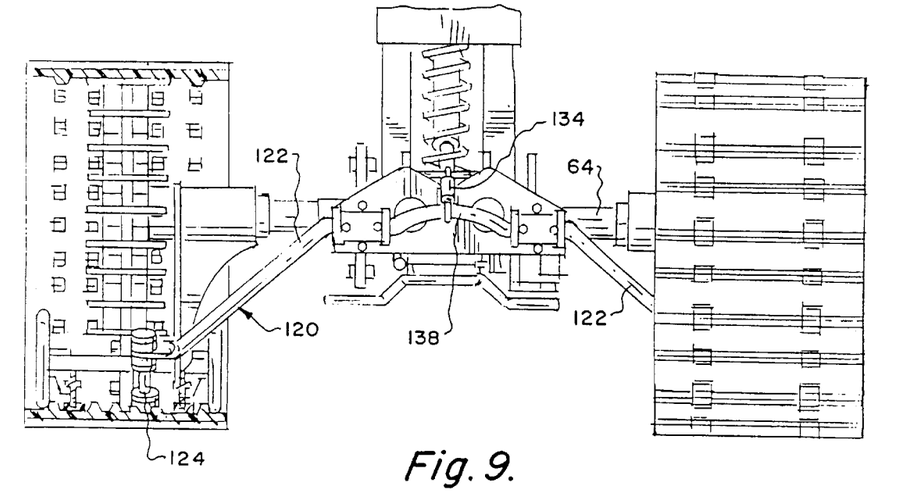
FIG. 9 is a partial sectional view similar to FIG. 2 illustrating an optional track motion limiting assembly.
Figure 10:
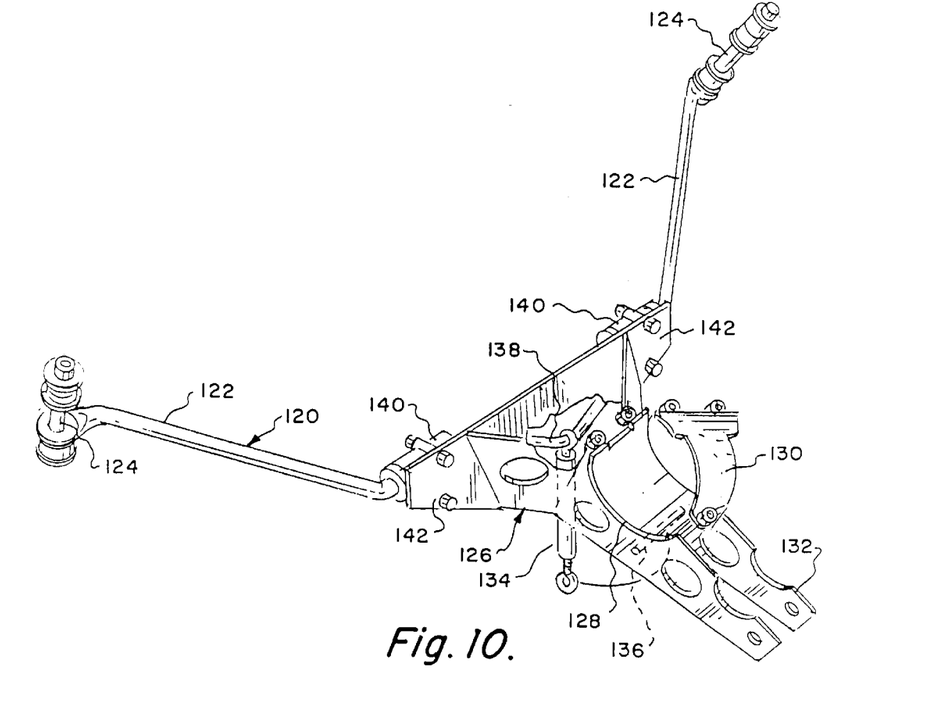
FIG. 10 is a perspective view of the optional track motion limiting assembly of FIG. 9.

In an optional embodiment, the motion of snow track assemblies 20 can be limited and stabilized by a sway, or torsion bar, assembly 120 illustrated in FIGS. 9 and 10. Optional motion limiting assembly 120 is provided to exert a downward force on snow track assemblies so they grip the snow and prevent "free wheeling" as previously described. Each end of torsion bar 122 is attached to a bracket 55 (shown in phantom in FIG. 3) by bolts 124. Torsion bar mounting bracket 55 is preferably welded on spacer plate 44 on slide rail assembly 30.

Torsion bar 122 is attached to the ATV by sway bar bracket mount 126. Sway bar bracket mount 126 is designed to fit the back of the ATV swing arm and provides support for sway or torsion bar 122. Sway bar mounting bracket 126 has a bracket 128 and clamping plate 130 for securing end 123 of sway bar mounting bracket 126 to the rear of the ATV swing arm and around axle housing 64.

Adjustment of torsion of sway bar 122 is provided by adjustable or turnbuckle linkage 134 passing through pin 136 on sway bar mounting bracket 126 to the center of sway bar 122 at 138. Sway bar 122 is securely fastened to sway mounting bracket 126 by connecting bushings 140 securely bolted to end plates 142. Connecting bushing 140 permit sway bar 122 to be fixed to sway bar mounting bracket 126 and down arm linkage allowing movement where needed and provide leverage for adjustment linkage 132. Resilient plastic bushings, preferably made of Teflon, and mounting 140, act as the bearing between sway bar 122 and the bracket connection.

Sway bar assembly 120 provides an important design element as it forms a very necessary function, similar to the function of motion limiting bracket assembly 90. The motion limiting assemblies effectively hold down and stabilize the tracks when riding over uneven terrain and jumps. Without the motion limiting assembly, the converted ATV would not handle well and could easily lose traction.

The motion limiting bracket assembly 90 is advantageous because it provides both primary and secondary functions and allows some free motion as is less restrictive than the sway bar assembly 120. Motion limiting bracket assembly 90 is a mechanism that is firmly attached to a fixed base of the ATV chassis and has adjustable linkages that connect the chassis to brackets on both snow track assemblies. Slot brackets 98 on each rear track assembly include an element having an elongation which allows each rear track assembly to move freely to a predetermined angle about axle 64. The distance of free motion is limited by the length of slot 110. The angle about the axle can be defined as a selection in the range of plus or minus fifty degrees (±50°) from a neutral track position with threaded shaft 112 at the center of the slot 110. A neutral position of zero degrees (0°) can be defined as the bottom of both snow track assemblies being approximately horizontal. Preferably, the slot bracket design should provide a free motion angle of at least approximately plus or minus twenty degrees (±20°) from the neutral position, or zero degrees.

Further, for good traction and smooth and easy riding, it is preferred that the snow track assembly should not be rigidly held in one position. Thus a semi-rigid preferably should be provided. This semi-rigid link is provided by motion limiting assemblies 90 or optional sway or torsion bar assembly 120. The motion limiting bracket 90, allowing some free motion, performs both primary and secondary functions very well. This assembly does not cause any problems with tensioning of the chain on ATVs. It is less stiff than the torsion bar assembly of the optional embodiment. Further, weight may be transferred to the front of the ATV, which often can be beneficial. With the motion limiting bracket assembly 90, the geometry of the tracks is such that when hung from axle 64, the rear end of each snow track assembly hangs lower than the front. This means that the snow track assembly tend toward a positive attitude and are not rigidly held as they may be with the optional sway or torsion assembly. This allows free movement over a limited "small angle range about the axle" and prevents forward or reverse flipping of the snow track assemblies.

Figure 11:
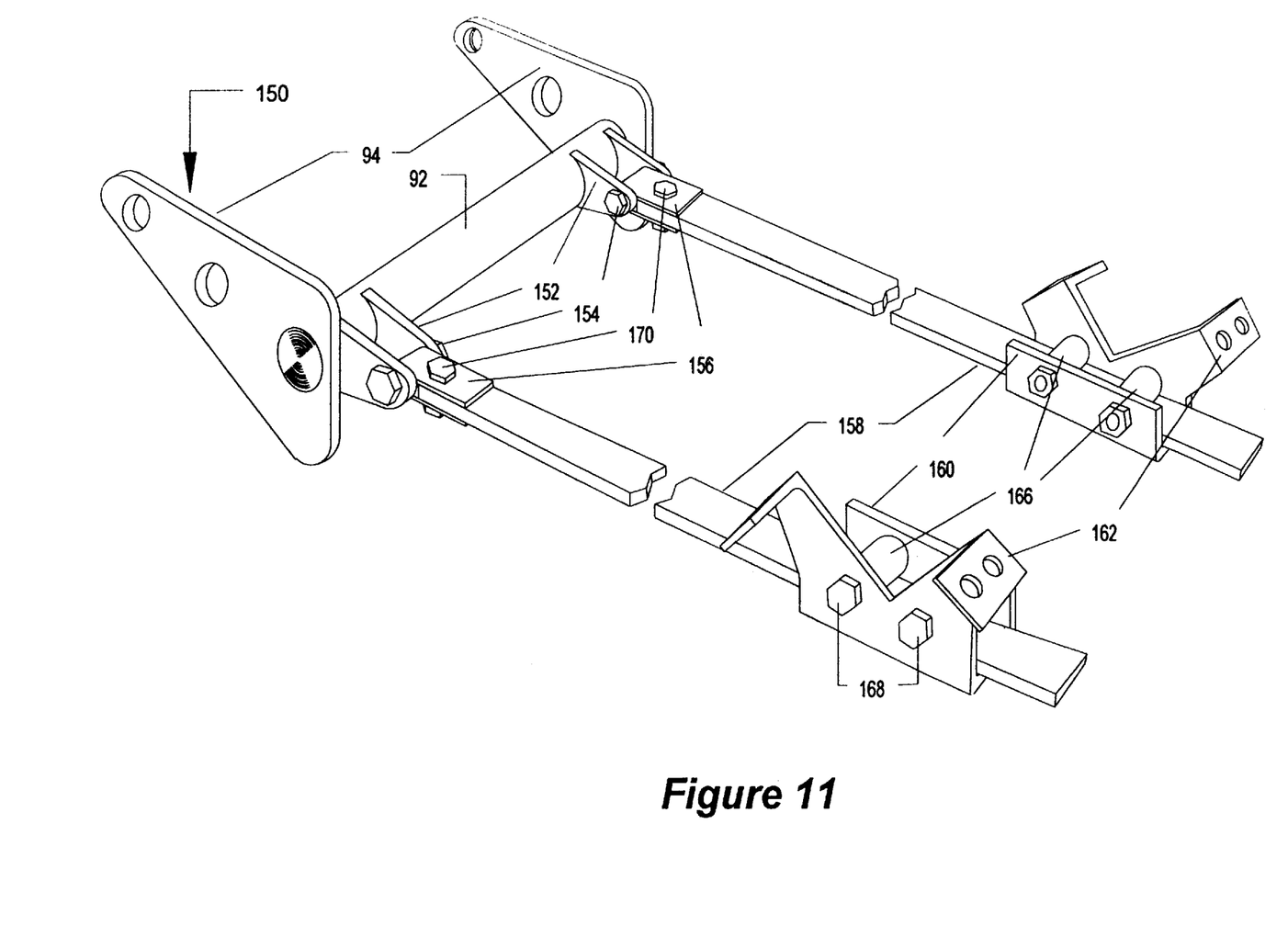
FIG. 11 is a perspective view of a track limiting assembly of the preferred embodiment.

An alternate, preferred embodiment of a motion limiting bracket assembly 150 is described in FIG. 11, wherein the bottom bracket 92 and flanges 94 of FIG. 8 are similarly employed to attach motion limiting bracket assembly 150 to the chassis of the ATV. Affixed to the parallel sets of flanges 152, by means of carriage bolts 154, are spring hinges 156, which can rotate freely about carriage bolts 154. A leaf spring bracket assembly 160 is attached to each bearing housing support bracket assembly 32, in the same manner as is motion-limiting assembly 90, by bolts 108 (not shown). Leaf spring bracket assembly 160 is comprised of attachment flanges 162 of u-shaped slide bracket 164. Disposed in parallel in slide bracket 164 are rollers 166 mounted by means of carriage bolts 168. Subtending the distance between each spring hinge 156 and each leaf spring bracket assembly 160 is leaf spring 158. Leaf spring 158 is attached to spring hinge 156 at one end by mounting bolt 170, and freely rotates with spring hinge 156 about carriage bolt 154. The distal end of leaf spring 158 is inserted between roller 166 and the bottom of slide bracket 164, and freely slides back and forth with rotation of bearing housing support bracket assembly 32 (not shown). The dimensions of slide bracket 164 are selected such that leaf spring 158 inhibits the rotation of bearing housing support bracket assembly 32, thereby restricting the amount of rotation of track assembly 20. At such time that track assembly 20 is not in contact with the terrain, leaf spring 158 biases track assembly 20 in a positive position relative to the terrain to enable proper position of track assembly 20 upon re-contacting with the terrain.

While the motion limiting bracket assemblies of FIGS. 2 and 8 are adjustable by means of tensioning mechanisms, the bracket assembly 150 is self-adjusting based on the load on the vehicle and the force imposed during operation. The length of leaf spring 158 is selected such that when track assembly reaches its maximum permitted rotation, leaf spring 158 remains extended through slide bracket 164.

Leaf springs are commonly available, and are produced to precise specification. Whereas any leaf spring of steel composition may be employed, the leaf spring of the exemplary embodiment was fabricated of carbon fiber, making it impervious to extreme conditions. The rollers were fabricated of urethane, with a stainless steel inner sleeve.

The primary and secondary purpose of the motion limiting assemblies is to prevent the tracks from tipping over when the machine becomes airborne or hits a significant bump, and also to provide the snow track assemblies with a positive attitude. That is, the motion limiting assemblies keep the front end of the track assemblies a little elevated above the rear when the ATV becomes airborne.

These motion limiting assemblies are important because of what happens to the tracks under typical conditions. These machines typically are ridden over uneven terrain and encounter big bumps that sometimes cause them to become airborne. This means that there should be a method to prevent each track assembly from spinning freely about the axle. While these methods are shown other methods could, of course, be provided within the scope of the disclosed invention.

Figure 5:
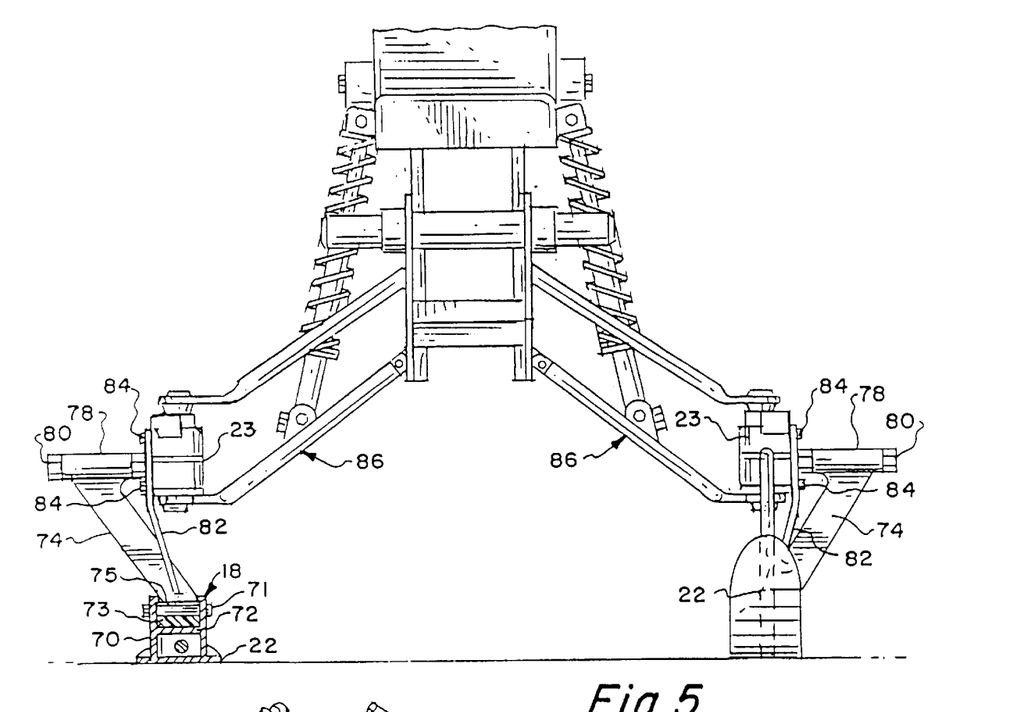
FIG. 5 is a partial sectional view taken at 5—5 of FIG. 1.
Figure 6:
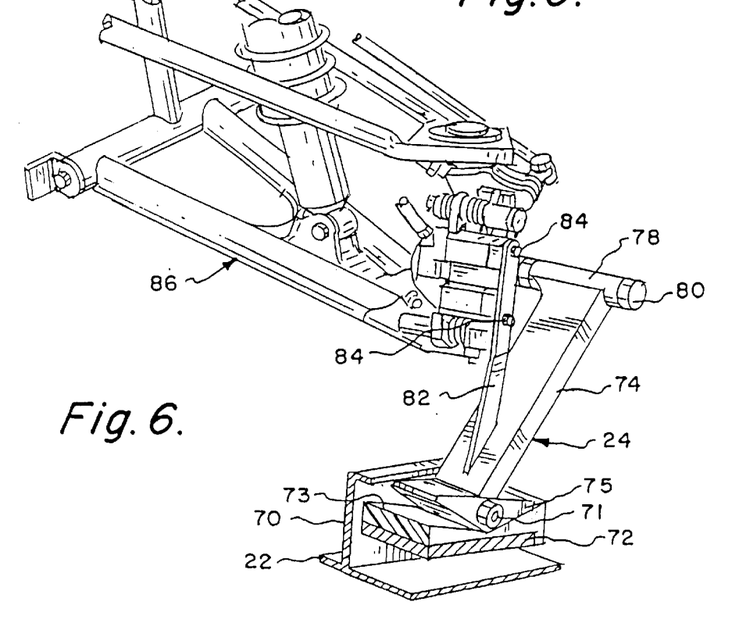
FIG. 6 is a partial sectional view illustrating the mounting of the front skis.

The assembly for mounting skis on the front end of ATV 10 is illustrated in FIGS. 5 and 6. Ski mount assembly 18, is comprised of snowmobile style skis 22 on ski mounting backbone 70, bolted by bolts 71 to ski mounting assembly support 24. Support 24 is bolted to ski mounting backbone 70 with memory pad 73 set between ski backbone shelf 72 and angled foot 75 at the bottom of support member 74 thereby holding the resilient memory pad in place.

Ski mounting assembly support 24 is comprised of support member 74, spindle housing 78 which fits on the ATV front end spindle fastened with bolt 80. Preferably, the center of ski 22 is in alignment with the pivot axis of front wheel mount 23. The system is stabilized with support brace 82 bolted to existing brake caliper mount 84, mounted on front wheel A-arm assembly 86 of ATV 10. The system is designed to minimize modification of existing ATV 10. Existing brake components, brake calipers and brake caliper mount 84 remain the same so that the ATV may be converted back for use on dirt by simply removing each ski mounting assembly 18 and remounting ATV wheels. The system shown in FIGS. 5 and 6 is for a quad or four-wheel ATV, but could be easily adapted for use with an ATV having a single front wheel. Alternatively, if both fron and back axles of the ATV are drive axles, the track system of the invention could be employed on all four wheels.

As with the motion limiting assembly, the ski mounting assembly support 24 is constructed to provide a positive attitude for skis 22. This positive attitude maintains ski 22 with the tip up when there is no weight on the front of the machine. This function is provided by resilient memory pads 73 set on support shelf 72 of ski backbone 70 as previously described. Memory pads 73 on each ski backbone 70 maintain the tip of skis 22 at a positive attitude when they are not weight bearing. That is, skis 22 have a "memory" position caused by memory pad 73 bumping foot 75 on the end of support member 74 so that the tips come up when the weight of ATV 10 is not on them.

The system disclosed allows a ATV 10 to be easily converted for use as a snow machine. The system permits existing tires and wheels on ATV 10 to be replaced with snow track mounting assemblies 20 and ski assemblies 18 without modification by simply bolting the components to the ATV 10. By this construction, it is a simple matter to convert ATV 10 to a snow machine and then convert it back for use on dirt. Another advantage of the system is that the dual track assemblies 20 provide a larger track area than most single-track snowmobiles.

The increase in track area to machine weight provides a more stable platform and excellent traction. The unique arrangement of the slide rail assembly also includes a tension adjustment to adjust the tension for different size tracks. The track area, which is larger than standard tracks, also spreads weight farther than the single track snowmobile. Another advantage is that the converted ATV will generally have longer suspension travel than the most standard snowmobiles.

Thus, there has been disclosed, a conversion system to convert a standard all terrain vehicle (ATV) for use as a snow machine, which is versatile and is easily converted back to an ATV. The system described allows rubber belted snow tracks and skis to be easily mounted and demounted from a standard ATV. The unique design permits conversion without any modification to existing ATVs, with all assemblies being bolted. The versatility and advantages can also save considerable expense; not only eliminating the need to purchase a snowmobile, but perhaps also eliminate the need for additional costs.

This invention is not to be limited by the embodiment shown in the drawings and described in the description which is given by way of example and not of limitation, but only in accordance with the scope of the appended claims.

I claim:

1. An endless track assembly for replacing a drive wheel of an all terrain vehicle having a chassis, the endless track assembly comprising:
    (a) a drive cog for mounting on an axle of the vehicle, the drive cog having a plurality of teeth for engaging lugs in an endless track, the drive cog having a diameter and a width, the diameter selected to optimize the track speed to gear ratio of said track assembly, and the width selected to optimize traction of said track;
    (b) a slide rail assembly, for attachment to the axle such that the slide rail assembly is in vertical alignment with the drive cog, the slide rail assembly comprising:
        (i) a first and second slide rail having a length selected to provide an optimal footprint of the track;
        (ii) spacer mounting means mounting said first and second slide rails at a predetermined spacing; and
        (iii) a plurality of guide wheels for engaging and guiding the endless track, the guide wheels comprising at least three sets of guide wheels, each set of guide wheels mounted in parallel on the slide rails;
    (c) an endless track mounted on the slide rail assembly and the drive cog, the track having lugs for engaging teeth on the drive cog; and
    (d) adjustable force balancing means for applying a biasing force to the endless track assembly, the force balancing means attaching between the slide rail assembly and the chassis of the vehicle.

2. The track assembly of claim 1 including adjusting means for adjusting the tension of the endless track mounted on the drive cog and slide rail assembly.

3. The track assembly of claim 2 in which the adjusting means for adjusting the tension of the endless track comprises means for adjusting the position of one set of the guide wheels.

4. The track assembly of claim 3 wherein each slide rail is contructed to contain a slot, horizontally disposed at a rearward end of each slide rail, the slots in parallel alignment in their respective slide rail, and in which the adjusting means comprises:
    (a) an axle disposed between and extending through the slots in the slide rails;
    (b) a plurality of guide wheels mounted on said axle; and
    (c) the axle being adjustably mounted in the slot in each side rail.

5. The track assembly of claim 4 in which the axle adjusting means comprises an adjusting bolt mounted on each slide rail adjacent and parallel to a forward end of said slot in each slide rail for engaging said axle; whereby adjustment of said bolts adjusts the position of said axle in said slot to increase or decrease the tension in the endless track.

6. The track assembly of claim 1 in which the slide rail assembly includes:

(a) a bearing mounting support assembly for mounting the slide rail assembly on the vehicle axle, the bearing mounting support assembly having a bearing housing constructed to slide on the vehicle axle, the bearing mounting support assembly connected to a support bracket;

(b) the support bracket for attaching the bearing housing to the first slide rail, the support bracket being connected to the spacer mounting means; and (c) the spacer mounting means for mounting the second slide rail in parallel, displaced alignment with the first slide rail.

7. The track assembly of claim 1 where the means for applying a biasing force to the endless track assembly is self-adjusting.

8. The track assembly of claim 7 where the force adjusting means comprises:

(a) a chassis mounting bracket, for attachment to the chassis of the vehicle, the chassis mounting bracket having means for pivotally engaging a leaf spring;

(b) a slide rail bracket assembly for attaching to the slide rail assembly, said slide rail bracket assembly having means for slideably engaging the leaf spring; and (c) the leaf spring subtending the distance between the chassis mounting bracket and the slide rail bracket assembly, the leaf spring engaging the slide rail bracket assembly.

9. The track assembly of claim 8 wherein the means for pivotally engaging the leaf spring is a spring hinge.

10. The track assembly of claim 8 wherein the means for slideably engaging the leaf spring comprises:

(a) a leaf spring bracket assembly, attached to the slide rail bracket assembly, the leaf spring bracket assembly having a first and second flange in opposing, parallel displacement, the first flange having at least one mounting hole in axial, parallel alignment with at least one mounting hole in the second flange, the mounting holes for receipt of a roller; and (b) a roller, subtending the distance between and affixed to the mounting holes of the opposing flanges, the roller for guiding the leaf spring in the leaf spring bracket assembly.

11. The track assembly of claim 1 in which the force balance means comprises;

(a) a torsion sway bar;

(b) a sway bar bracket to be bolted to a swing arm on the all terrain vehicle;

(c) a connecting bracket on the slide rail assembly connected to an outboard end of said torsion sway bar; wherein the force adjusting means connects the torsion sway bar to the sway bar bracket.

12. The track assembly of claim 11 in which said force adjusting means comprises; an adjustable length turnbuckle connecting said torsion sway bar to said sway bar bracket.

13. The track assembly claim 1 in which there are two endless track assemblies for mounting on a drive axle of said all terrain vehicle; said endless tracks selected to provide a footprint in the range of five hundred and seventy-five to seven hundred and seventy-five square inches (575 to 775 inches$^2$).

14. The track assembly of claim 13 in which said endless tracks provide a footprint of approximately six hundred and seventy five square inches (675 inches$^2$).

15. The track assembly of claim 1 in which the force balancing means comprises motion limiting means for connecting each track assembly to the vehicle chassis.

16. The track assembly of claim 15 in which said motion limiting means comprises a pair of link arms for connecting each track assembly to the vehicle chassis.

17. The track assembly of claim 16 in which said motion limiting means includes adjustable means to vary the stabilizing force on each track assembly.

18. The track assembly of claim 17 in which said adjustable means comprises length adjusting means for adjusting the length of said link arms.

19. The track assembly of claim 18 in which said adjustable means includes a slot bracket mounted on each track assembly, one end of each adjustable link arm being movably mounted on said slot bracket.

20. The track assembly of claim 19 in which the angle of each link arm about the axle can be in the range of ±50°.

21. The track assembly of claim 20 in which the angle of each link arm about the axle is ±20°.

22. An endless track assembly for replacing a drive wheel of an all terrain vehicle having a chassis, the endless track assembly comprising;

(a) a drive cog for mounting on an axle of the vehicle, the drive cog having, a plurality of teeth for engaging lugs in an endless track;

(b) a slide rail assembly, for attachment to the axle, the slide rail assembly disposed in vertical alignment with the drive cog, the slide rail assembly comprising:

(i) a bearing mounting support assembly for mounting the slide rail assembly on the vehicle axle, the bearing mounting support assembly having a bearing housing constructed to slide on the axle, the bearing, mounting support assembly connected to a support bracket, (ii) the support bracket for attaching the bearing housing to a first slide rail, the support bracket being connected to the spacer mounting means, (iii) the spacer mounting means for mounting a second slide rail in parallel, displaced alignment with the first slide rail, the first and second slide rail having a length selected to provide an optimal footprint of said track, and (iv) a plurality of guide wheels for engaging and guiding the endless track, the guide wheels comprising at least three sets of guide wheels, each set of guide wheels mounted in parallel on the slide rails;

(c) an endless track mounted on the slide rail assembly and the drive cog, the track having lugs for engaging teeth on the drive cog; and (d) adjustable force balancing means disposed between the vehicle chassis and the slide rail assembly, the force balancing means for applying a biasing force to the endless track assembly, the force adjusting means comprising:

(i) a chassis mounting bracket, for attachment to the chassis of the vehicle, the chassis mounting bracket having means for pivotally engaging a leaf spring, (ii) a slide rail bracket assembly for attaching to the slide rail assembly, said slide rail bracket assembly having means for slideably engaging the leaf spring, and (iii) the leaf spring subtending the distance between the chassis mounting bracket and the slide rail bracket assembly, the leaf spring engaging the slide rail bracket assembly.

23. The track assembly of claim 22 wherein each slide rail is constructed to contain a slot horizontally disposed at a rearward end of each slide rail, the slots in parallel alignment in their respective slide rail, the track assembly including adjusting means for adjusting the tension of the endless track mounted on the drive cog and slide rail assembly, the means comprising;

(a) an axle disposed between and extending through the slots in the slide rails;

(b) a plurality of guide wheels mounted on said axle;

(c) an adjusting bolt mounted on each slide rail adjacent and parallel to a forward end of said slot in each slide rail for engaging the axle; and whereby adjustment of said bolts adjusts the position of said axle in said slot to increase or decrease the tension in the endless track.

24. The track assembly of claim 22 wherein the means for pivotally engaging the leaf spring is a spring hinge.

25. The track assembly of claim 22 wherein the means for slideably engaging the leaf spring comprises:

(i) a leaf spring bracket assembly, attached to the slide rail bracket assembly, the leaf spring, bracket assembly having a first and second flange in opposing, parallel displacement, the first flange having at least one mounting hole in axial, parallel alignment with at least one mounting hole in the second flange, the mounting holes for receipt of at least one roller; and (ii) the roller, subtending the distance between and affixed to the mounting holes of the opposing flanges, the roller for guiding the leaf spring in the leaf spring bracket assembly.

26. The track assembly of claim 22 in which there are two endless track assemblies mounted on a drive axle of said all terrain vehicle; said endless tracks selected to provide a footprint in the range of five hundred and seventy-five to seven hundred and seventy-five square inches (575 to 775 inches$^2$).

27. The track assembly of claim 26 in which the endless tracks provide a footprint of approximately six hundred and seventy five square inches (675 inches$^2$).

* * * * *